(12) United States Patent
Sharma et al.

(10) Patent No.: US 6,259,728 B1
(45) Date of Patent: Jul. 10, 2001

(54) DATA COMMUNICATION SYSTEM AND METHOD

(75) Inventors: Ramautar Sharma, Berkeley Heights, NJ (US); Kevin A. Shelby, Marietta, GA (US)

(73) Assignee: Lucent Technologies Inc., Murray Hill, NJ (US)

( * ) Notice: Subject to any disclaimer, the term of this patent is extended or adjusted under 35 U.S.C. 154(b) by 0 days.

(21) Appl. No.: 09/328,082

(22) Filed: Jun. 8, 1999

(51) Int. Cl.[7] .............................. H04B 1/38; H04L 27/10; H04L 27/18; H04L 5/16

(52) U.S. Cl. ..................... 375/223; 375/261; 370/484; 341/111

(58) Field of Search ................................... 375/222, 223, 375/260, 261, 267; 370/204, 208, 210, 484, 487, 436, 478, 330; 341/111

(56) References Cited

U.S. PATENT DOCUMENTS 5,768,268 * 6/1998 Kline et al. ........................... 370/330
5,838,268 * 11/1998 Frenkel ................................. 341/111

OTHER PUBLICATIONS

Gross, et al., "Discrete Wavelet Multitone (DWMT) System for Digital Transmission Over HFC Links," SPIE vol. 2609, 1995, pp. 168–175.

Sandberg, et al., "Overlapped Discrete Multitone Modulation for High Speed Copper Wire Communications, " IEEE Journal on Selected Areas in Communications, vol. 13, No. 9, Dec. 1995, pp. 1571–1585.

Tzannes, et al., "DMT Systems, DWMT Systems, and Digital Filter Banks," Heller ICC, 1994, May 1–5, 1994k, pp. 311–315.

* cited by examiner

*Primary Examiner*—Chi Pham
*Assistant Examiner*—Phuong Phu
(74) *Attorney, Agent, or Firm*—Thomas, Kayden, Horstemeyer & Risley, LLP

(57) ABSTRACT

Disclosed is a system and method for modulating and demodulating a data signal. The system includes a number of configurable multi-rate signal processing modules coupled to a local interface. The system also includes a control module coupled to the local interface, the control module being adapted to shuttle a number of data symbols among the configurable multi-rate processing modules according to a predefined modulation or demodulation scheme. The system can advantageously be configured to perform one of multiple modulation or demodulation schemes.

29 Claims, 9 Drawing Sheets

DATA COMMUNICATION SYSTEM AND METHOD

TECHNICAL FIELD

The present invention is generally related to the field of data communications, and, more particularly, is related to a system and method for modulating and demodulating a data signal.

BACKGROUND OF THE INVENTION

In data communications, there are many different types of modulation or demodulation schemes that are employed to facilitate the communication of data across a particular channel. For example, there exist several protocols that may be employed, including carrierless amplitude/phase (CAP), orthogonal frequency division multiplexing (OFDM), and discrete wavelet multiplexing (DWM), as well as other protocols. Communications channels employed may include various networks such as local area networks, wide area networks, telecommunications networks, or other networks that employ various media such as wire, optical fiber, air, or other media, or combinations of these media.

However, currently different protocols include specific advantages and disadvantages related to the specific environments in which they are employed and, consequently, all are still in use and are likely to be employed in the foreseeable future. As a result, data communications providers continue to manufacture data communications equipment to meet these different protocols.

SUMMARY OF THE INVENTION

In light of the foregoing, the present invention provides a highly configurable data communication system and method that is designed to accommodate multiple data communications protocols.

Briefly described, in architecture, the system comprises a configurable modem circuit for modulating or demodulating a data signal. The modem circuit includes a number of configurable multi-rate signal processing modules coupled to a local interface. The system also includes a control module coupled to the local interface, the control module being adapted to shuttle a number of data symbols among the configurable multi-rate processing modules according to a predefined modulation or demodulation scheme. The modem circuit can advantageously be configured to perform one of multiple modulation or demodulation schemes.

The present invention may also be viewed as a method for modulating a data signal for transmission over a communications channel, comprising the steps of: mapping a number of data symbols in a data signal; shuttling a number of mapped data signals among a number of synthesis modules via a local interface; processing the mapped data signals in the synthesis modules; and, summing a number of quadrature symbols and a number of in-phase symbols generated by the synthesis modules to generate a modulated data output signal.

Additionally, the present invention may also be viewed as a method for demodulating a data signal transmitted over a communications channel, comprising the steps of: generating a number of quadrature symbols and a number of in-phase symbols from a modulated data signal; shuttling the quadrature and in-phase symbols among a number of analysis modules via a local interface; processing the quadrature and in-phase symbols in the analysis modules; and, de-mapping the quadrature and in-phase symbols, thereby recovering an original data signal.

The present invention provides significant advantages in that the same hardware is highly configurable to perform any one of a number of modulation and demodulation schemes, thus gaining economies of scale in production where only one circuit need be produced rather than multiple circuits to accommodate the various types of modulation and demodulation schemes. Other advantages of the invention include the fact that it is simple in design, user friendly, robust and reliable in operation, efficient in operation, and easily implemented for mass commercial production.

Other features and advantages of the present invention will become apparent to one with skill in the art upon examination of the following drawings and detailed description. It is intended that all such additional features and advantages be included herein within the scope of the present invention.

BRIEF DESCRIPTION OF THE SEVERAL VIEWS OF THE DRAWINGS

The invention can be better understood with reference to the following drawings. The components in the drawings are not necessarily to scale, emphasis instead being placed upon clearly illustrating the principles of the present invention. Moreover, in the drawings, like reference numerals designate corresponding parts throughout the several views.

DETAILED DESCRIPTION OF THE INVENTION

Figure 1:
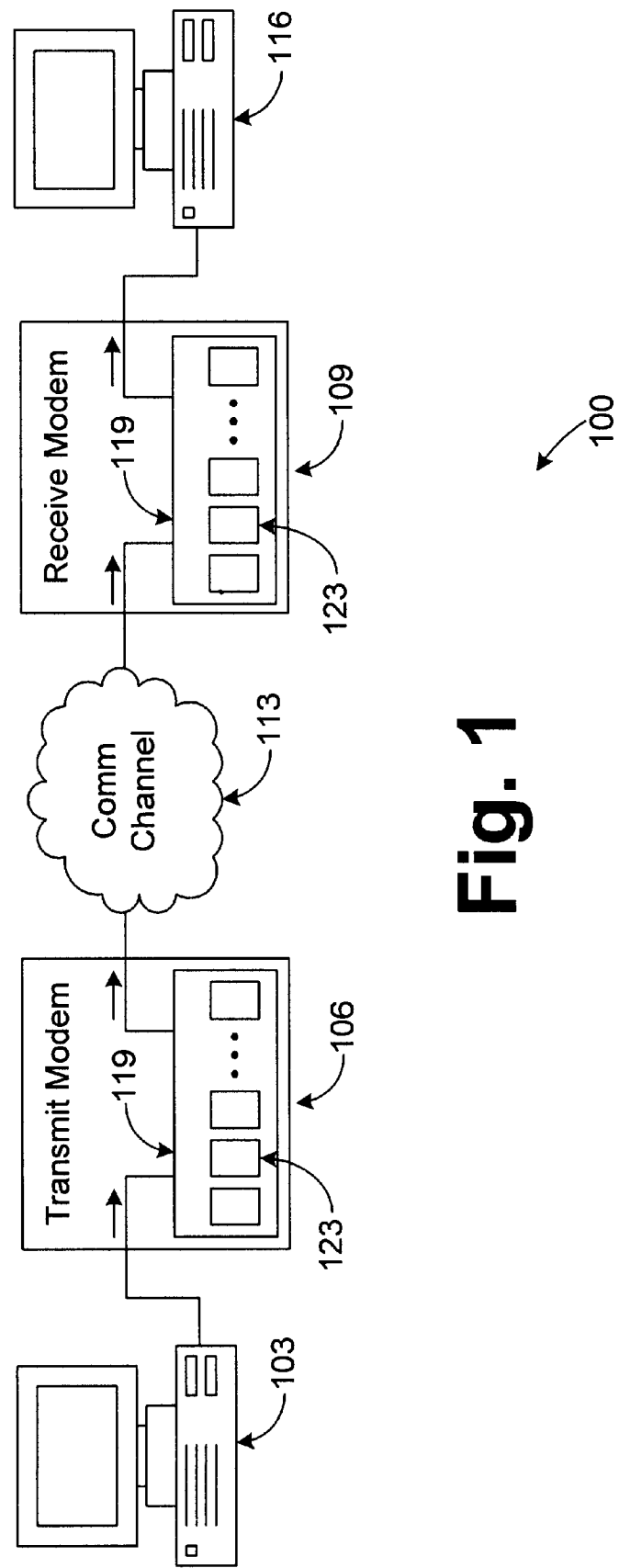
FIG. 1 is a drawing of a data communications system according to an embodiment of the present invention.

With reference to FIG. 1, shown is a data communications system 100 according to an embodiment of the present invention. The data communications system 100 includes a first data terminal device 103 that is coupled to a transmit modem 106. The transmit modem 106 is coupled to a receive modem 109 via a communications channel 113. The receive modem 109 is also coupled to a second data terminal device 116. The first and second data terminal devices 103 and 116 may be, for example, computers, workstations, or other device which may originate data to be transmitted or may receive data transmitted. The communications channel 113 may be, for example, networks such as local area networks, wide area networks, telecommunications networks, etc., that employ various media such as two wire pairs, coaxial cable, air, optical fiber, or other suitable media.

The transmit and receive modems 106 and 109 each include a highly configurable modem circuit 119 that includes a number of multi-rate signal processor modules 123 and other components that are to be discussed. The modem circuits 119 provide a significant advantage in that they can be configured to perform as a modulator and a demodulator for a variety of modulation/demodulation schemes as will be discussed. The multi-rate signal processor modules 123 are termed "multi-rate" generally because the sample rate of the output of these modules 123 is generally different than the sample rate of their inputs.

The data communications system 100 is depicted as a unidirectional, with data originating at the first data terminal device 103 and being transmitted to the second data terminal device 116 via the transmit and receive modems 106 and 109, and the communications channel 113. It is understood, however, that the present invention includes bi-directional data communication, where the functionality of both the transmit and receive modems 106 and 109 is located in a single bi-directional modem. Explained further, the modem circuits 119 can be configured to perform both modulation and demodulation tasks either individually or simultaneously. The unidirectional flow of data shown is to facilitate the discussion of the present invention.

Figure 2A:
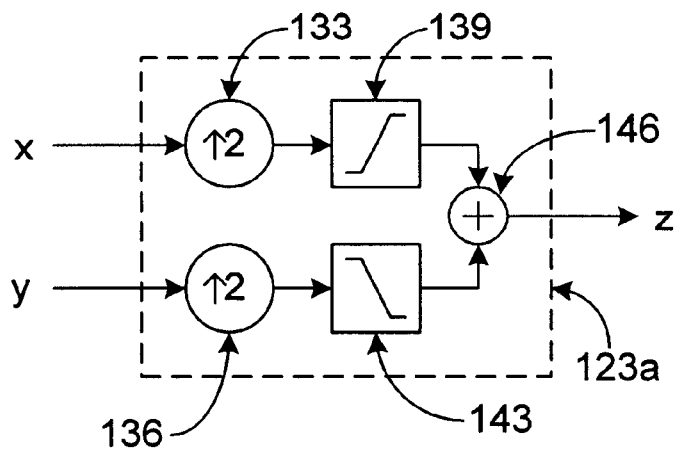
FIG. 2A is a functional block diagram of a synthesis module employed in the data communications system of FIG. 1.

Turning to FIG. 2A, shown is a block diagram of a synthesis module 123a. The synthesis module 123a actually comprises one of the multi-rate signal processor modules 123 (FIG. 1) configured to perform a synthesis task according to an embodiment of the present invention. The synthesis module 123a is termed "synthesis" due to the modulation task it performs in generating a modulated data signal from a number of data symbol components or contributions. The synthesis module 123a includes a first sample rate converter 133 and a second sample rate converter 136, both of which up-convert the sample rate of a data signal applied thereto by a factor of two, although other rate conversion factors may be employed. A stream of first data symbols x is applied to the first sample rate converter 133 and a second stream of data symbols y is applied to the second sample rate converter 136. The up-converted first and second data streams x and y are then applied to a first synthesizing digital filter 139 and a second synthesizing digital filter 143, respectively. The first synthesizing digital filter 139 is a high pass filter with a first set of predetermined filter coefficients. For this reason, the input x is termed a "high pass input" to the synthesis module 123a. The second synthesizing digital filter 143 is a low pass filter with a second set of predetermined filter coefficients where the input y is accordingly termed the "low pass input". The cutoff frequencies, number of filter coefficients, and the actual values of the filter coefficients employed by the digital filters 139 and 143 depend upon the specific environment in which the synthesis module 123a is employed. The outputs of the digital filters 139 and 143 are applied to an adder 146 that generates the data output z of the synthesis module 123a.

The synthesis module 123a may also be employed as a single low pass up-converting filter or as a single high pass up-converting filter by manipulating the inputs x and y appropriately. To configure the synthesis module 123a as a low pass up-converting filter, the high pass input x is set to zero and the stream of data to be filtered is applied to the low pass input y. Alternatively, the synthesis module 123a is configured as a high pass up-converting filter by setting the low pass input y to zero and applying the stream of data to the high pass input x. Thus, the synthesis module 123a provides a significant advantage in that it may be used for multiple filtering purposes as needed.

Figure 2B:
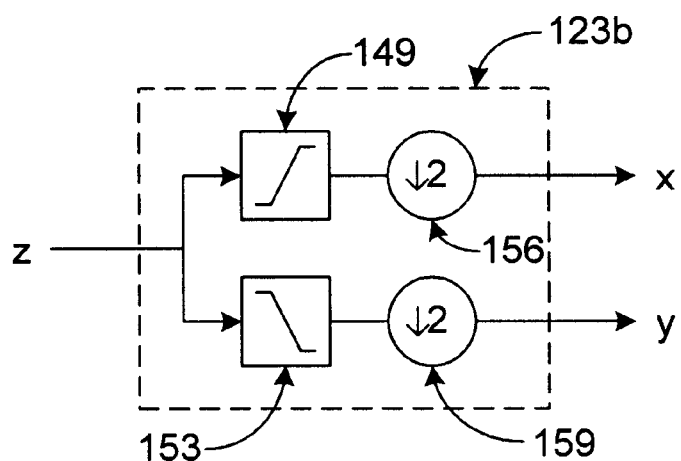
FIG. 2B is a functional block diagram of an analysis module employed in the data communications system of FIG. 1.

Referring next, to FIG. 2B, shown is a block diagram of an analysis module 123b. The analysis module 123b actually comprises a multi-rate processor module 123 (FIG. 1) configured to perform an analysis task according to an embodiment of the present invention. The analysis module 123b generally has the reverse functionality of the synthesis module 123a and are termed "analysis" due to the demodulation task it performs in recovering a number of data symbol components from a modulated data signal. In particular, a stream of modulated data symbols z is applied to both a first analyzing digital filter 149 and a second analyzing digital filter 153. The first analyzing digital filter 149 is a high pass filter and the second analyzing digital filter 153 is a low pass filter. The cutoff frequencies and the actual number of filter coefficients employed by the digital filters 149 and 153 depend upon the specific environment in which a particular analyzing multi-rate processor module 129 is employed. The output of the first analyzing digital filter 149 is applied to a first sample rate converter 156 and the output of the second analyzing digital filter 153 is applied to a second sample rate converter 159. The first and second sample rate converters 156 and 159 down-convert the stream of data symbols from the digital filters 149 and 153 by a factor of two, although other down conversion factors may be used. Each of the sample rate converters 156 and 159 output a stream of data symbols x and y. The output of the first sample rate converter 156 is termed a high pass output as it is generated with the high pass filter 149 and, likewise, the output of the second sample rate converter 159 is termed a low pass output as it is generated with the low pass filter 153.

Figure 3A:
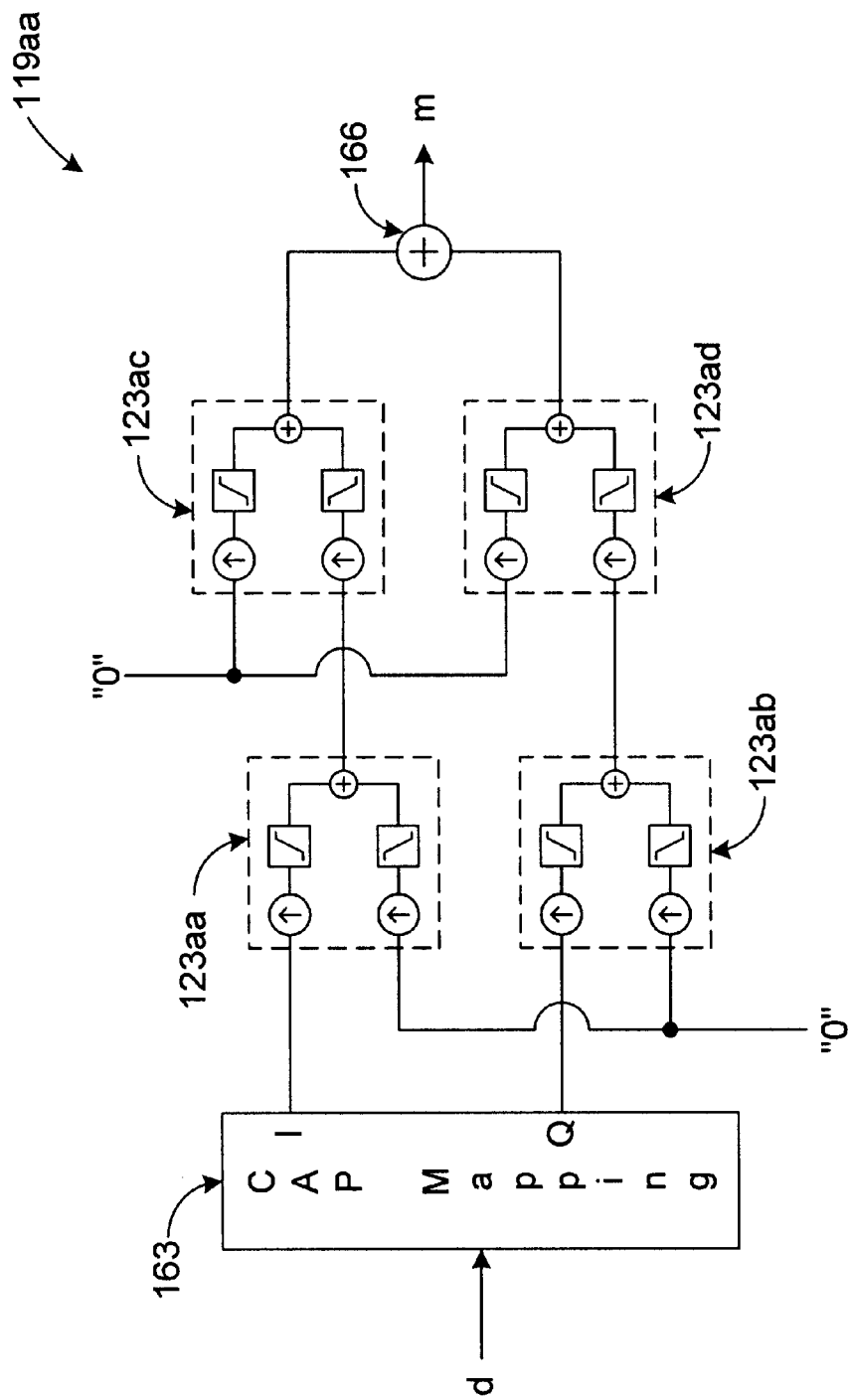
FIG. 3A is a functional block diagram of a first modulation scheme using a number of the synthesis modules as depicted in FIG. 2A.

Turning to FIG. 3A, shown is a functional block diagram of a first modulator 119aa that employs a number of the synthesis modules 123a arranged in a configuration to perform carrierless amplitude/phase (CAP) modulation. A stream of data symbols d to be transmitted is applied to the first modulator 119aa and is applied to a CAP mapper 163. The CAP mapper 163 maps the data symbols d into a stream of in-phase symbols I and a stream of quadrature symbols Q. The first modulator 119aa includes first, second, third, and fourth synthesis modules 123aa–123ad. The in-phase symbols I are applied to the high pass input and a zero "0" is applied to the low pass input of the first module 123aa. In a similar fashion, the quadrature symbols Q are applied to the high pass input and another zero "0" is applied to the low pass input of the second module 123ab.

The output of the first module 123aa is applied to the low pass input of the third module 123ac and the output of the second module 123ab is applied to the low pass input of the fourth module 123ad. A zero "0" is applied to the high pass inputs of the third and fourth modules 123ac and 123ad that effectively removes the contribution of the high pass portion of the modules, thereby converting the third and fourth modules 123ac and 123ad into upconverted low pass filters. The outputs of the third and fourth modules 123ac and 123ad are applied to an adder 166 that generates a modulated output data signal m of the first modulator 119aa. This output is applied to a digital-to-analog converter (not shown) and, thereafter, to the communications channel 113 (FIG. 1). The first modulator 119aa shows how the synthesis modules 123a may be employed to achieve a CAP modulation configuration which transmits information using a specific frequency band.

Figure 3B:
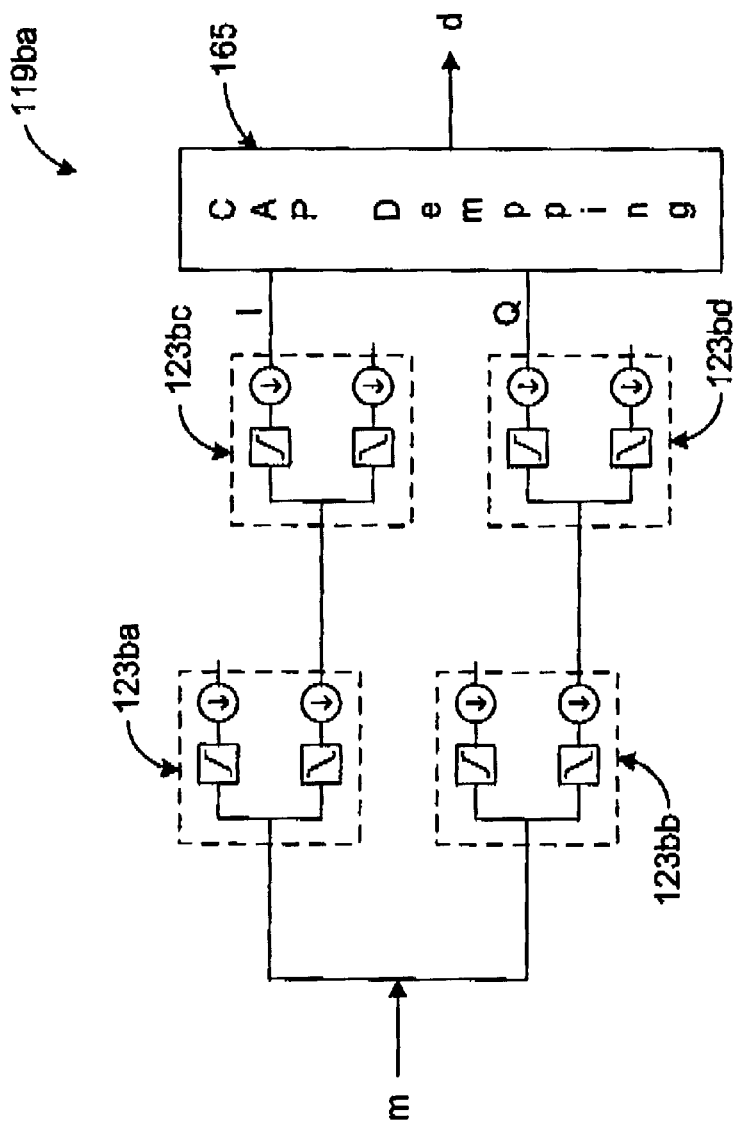
FIG. 3B is a functional block diagram of a first demodulation scheme using a number of the analysis modules as depicted in FIG. 2B.

With reference to FIG. 3B, shown is a first demodulator 119ba that is the counterpart of the first modulator 119aa (FIG. 3A). The first demodulator 119ba is comprised of first, second, third, and fourth analysis modules 123ba–123bd as shown. A modulated data signal m is applied to the input of the first and second analysis modules 123ba and 123bb. The low pass output from the first and second analysis modules 123ba and 123bb is applied to the inputs of the third and fourth analysis modules 123bc and 123bd and the high pass outputs are not used and are terminated as shown. The high pass outputs which comprise streams of in-phase and quadrature symbols I and Q from the third and fourth analysis modules 123bc and 123bd are thereafter applied to a CAP de-mapper that generates a data output d. The low pass outputs of the third and fourth analysis modules 123bc and 123bd are not used and are terminated as well. Thus, the first demodulator 119ba performs the reverse functionality of the first modulator 119aa to regain the data signal d from the modulated data signal m.

Figure 4A:
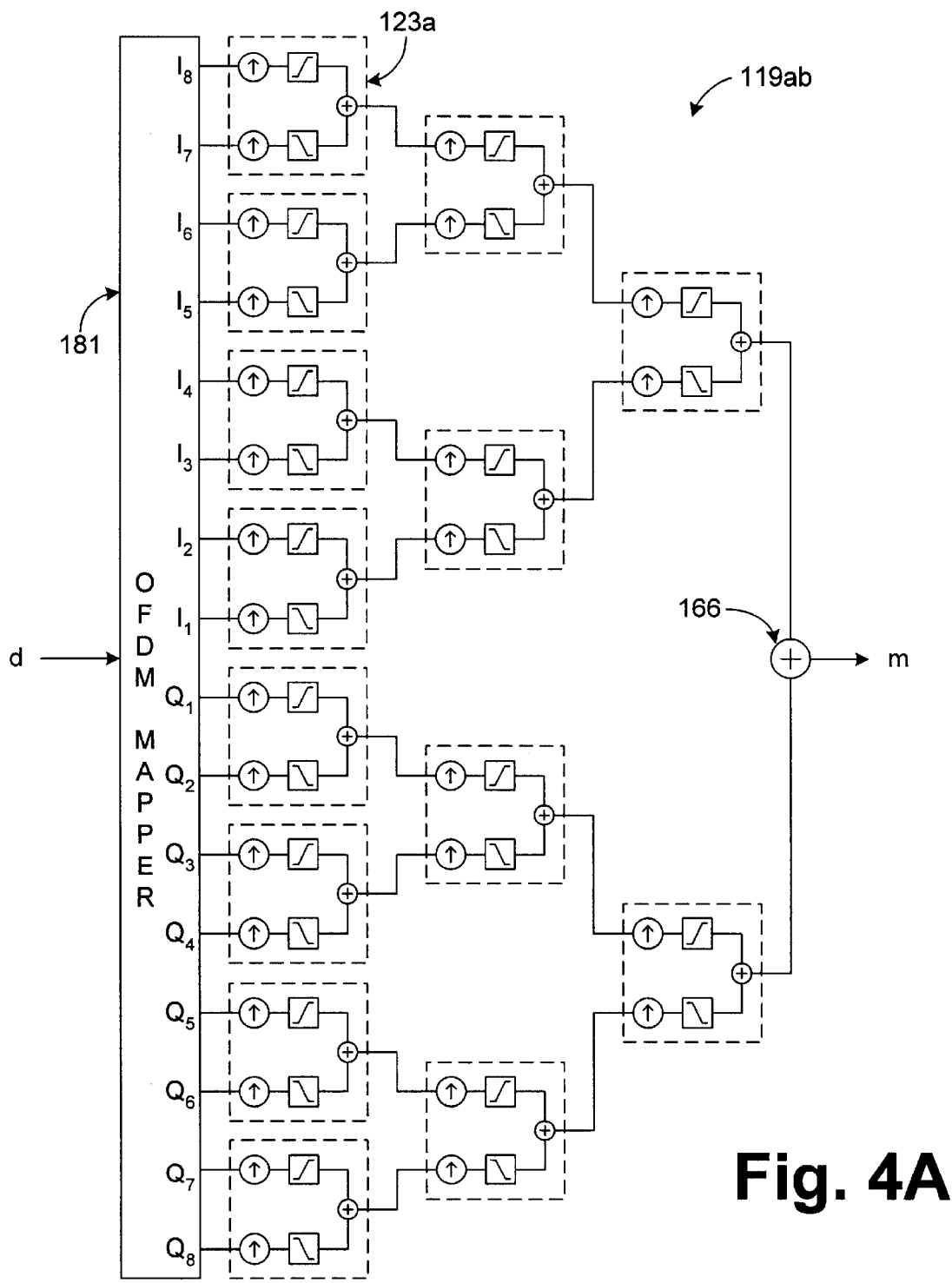
FIG. 4A is a functional block diagram of a second modulation scheme using a number of the synthesis modules as depicted in FIG. 2A.

Turning to FIG. 4A, shown is a second modulator 119ab that employs a number of the synthesizing modules 123a in a configuration to perform orthogonal frequency division multiplexing (OFDM) modulation such as, for example, discrete multi-tone (DMT) modulation. In the second modulator 119ab, the synthesizing modules 123a are interconnected in multiple stages to create a linearly spaced, frequency division arrangement or sub-band composition having a number of channels.

The second modulator 119ab includes an OFDM mapper 181 to which a stream of data symbols d is applied. The OFDM mapper 181 generates multiple streams of in-phase symbols $I_X$ and multiple streams of quadrature symbols $Q_X$ corresponding to multiple channels in the second modulator 119ab. Although there are eight channels shown, it is understood that the second modulator 119ab have any number of channels, whereas the eight channels shown are for purposes of illustration. The second modulator 119ab also includes a number of synthesizing modules 123a grouped into two multiple stage, pyramid-like circuits as shown, where the upper synthesizing modules 123a process the streams of in-phase symbols $I_X$, and the bottom synthesizing modules 123a process the streams of quadrature symbols $Q_X$. The final two streams of symbols resulting from the processing by the synthesizing modules 123a are then applied to the adder 166 that generates a modulated data output m of the second modulator 119ab. This output is applied to a digital-to-analog converter (not shown) and, thereafter, to the communications channel 113 (FIG. 1).

Figure 4B:
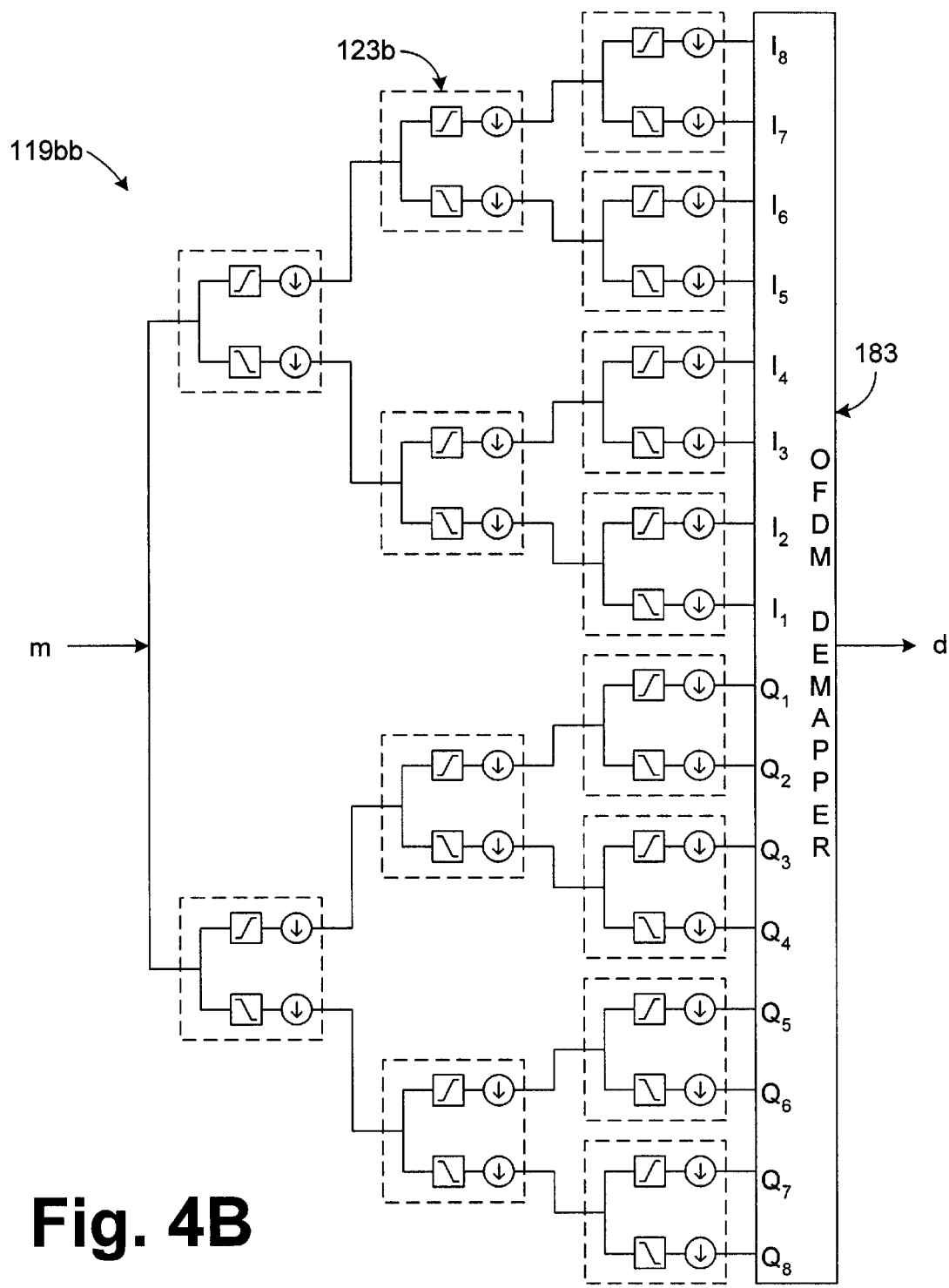
FIG. 4B is a functional block diagram of a second demodulation scheme using the analysis module as depicted in FIG. 2B.

Referring next, to FIG. 4B, shown is a second demodulator 119bb that is the counterpart of the second modulator 119ab (FIG. 4A). The second demodulator 119bb includes a number of analysis modules 123b in a configuration to perform orthogonal frequency division multiplexing (OFDM) demodulation. The analysis modules 123b are grouped into two in multiple stage pyramid-like circuits as shown, where the upper analysis modules 123b generate the in-phase symbols $I_X$, and the bottom analysis modules 123b generate the quadrature symbols $Q_X$. The high pass and low pass outputs of each of the analysis modules 123b in the rightmost stage of the pyramid-like circuits are applied to an OFDM de-mapper 183 that generates the transmitted stream of data symbols d therefrom. The stream of data symbols d is applied to an appropriate data terminal device or other apparatus, etc.

Figure 5A:
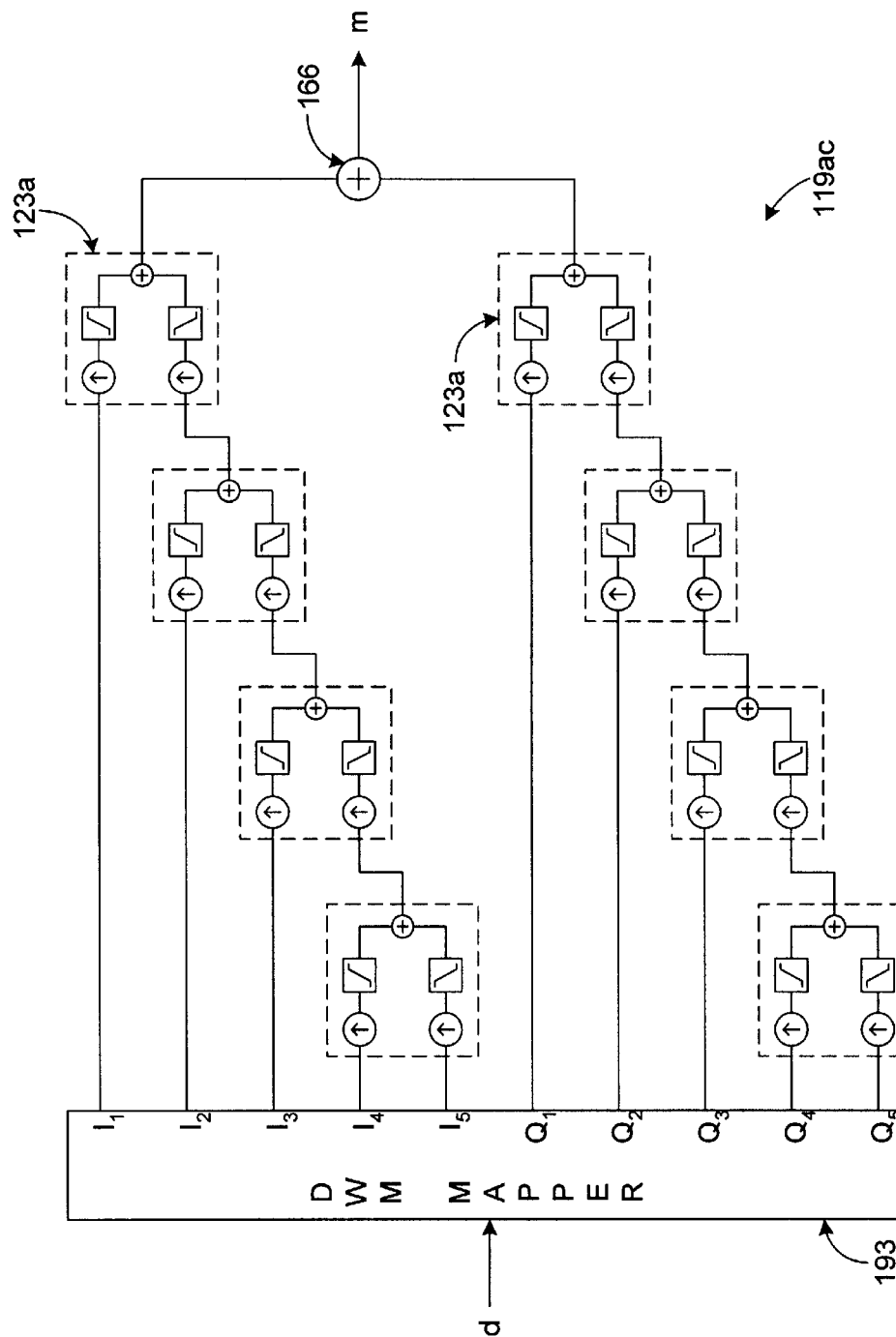
FIG. 5A is a functional block diagram of a third modulation scheme using a number of the synthesis modules as depicted in FIG. 2A.

With reference to FIG. 5A, shown is a third modulator 119ac that employs a number of the synthesizing modules 123a in a configuration to perform discrete wavelet modulation (DWM). The third modulator 119ac includes a DWM mapper 193 that generates a number of streams of in-phase $I_X$ and quadrature $Q_X$ symbols from an input stream of data symbols d. The streams of in-phase $I_X$ and quadrature $Q_X$ symbols are applied to respective inputs of the synthesizing modules 123a as shown. The synthesizing modules 123a are arranged to generate short pulses that are simultaneously time and band limited. There are five channels, each with a corresponding in-phase $I_X$ and quadrature $Q_X$ component, although it is understood that any number of channels may be employed, the five channel third modulator 119ac being shown for purposes of illustration. The outputs of the rightmost synthesizing modules 123a are applied to an adder 166 that generates a stream of modulated data symbols m that are applied to a digital-to-analog converter (not shown) and, thereafter, to the communications channel 113 (FIG. 1).

Figure 5B:
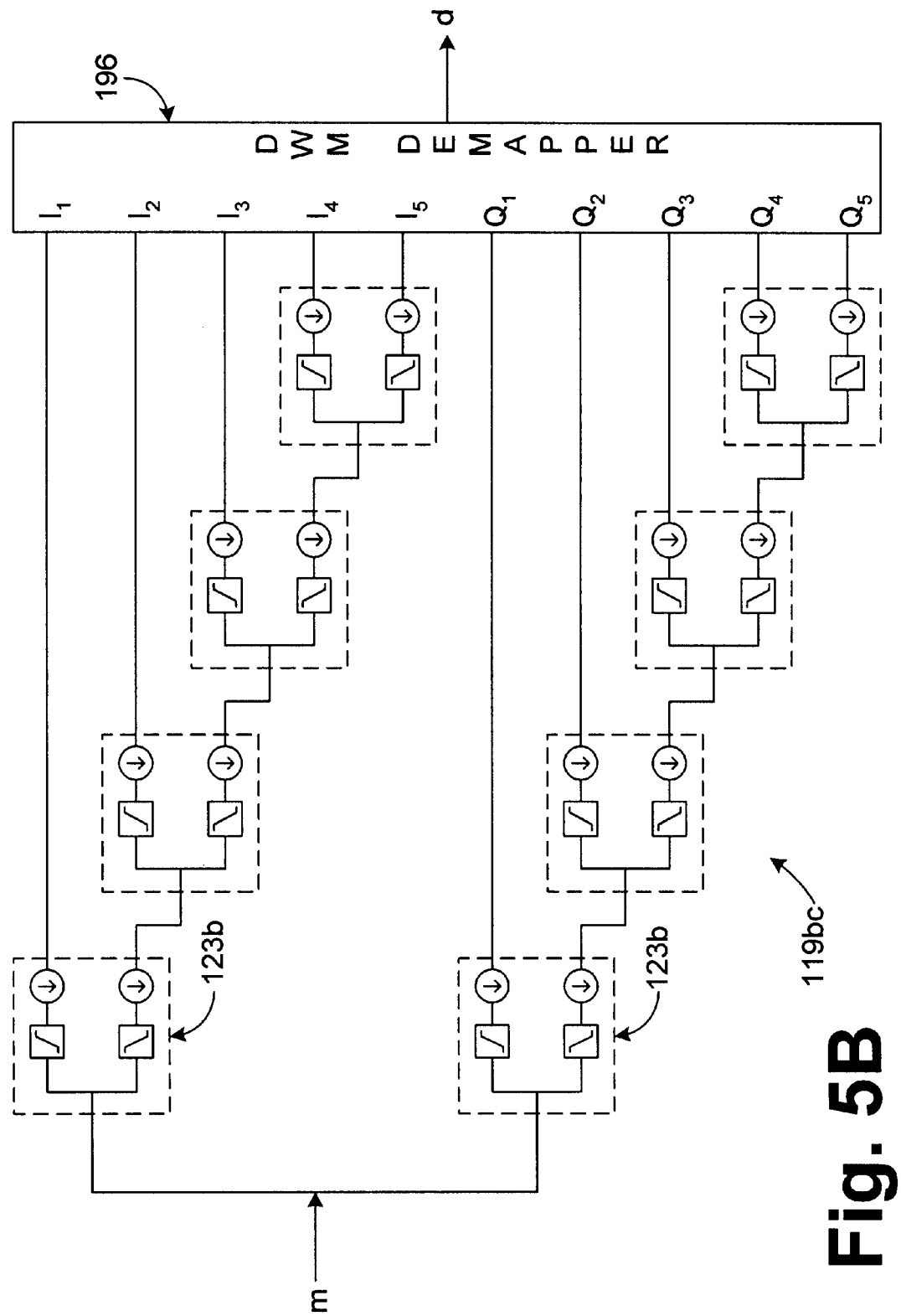
FIG. 5B is a functional block diagram of a third demodulation scheme using the analysis module as depicted in FIG. 2B.

Referring next, to FIG. 5B, shown is a third demodulator 119bc that is the counterpart of the third modulator 119ac (FIG. 5A). The third demodulator 119bc includes a number of analysis modules 123b in a configuration to perform orthogonal frequency division multiplexing (OFDM) demodulation. Specifically, the third demodulator 119bc includes two staggered arrangements of four analysis modules 123b as shown, which correspond with the synthesis modules 123a (FIG. 5A) of the third modulator 119ac. A stream of modulated data symbols m is applied to the inputs of the leftmost analysis modules 123b. The high pass output of each of the analysis modules 123b is coupled to a DWM de-mapper 196. In addition, the low pass outputs of the rightmost analysis modules 123b are applied to the DWM de-mapper 196 as well. The DWM de-mapper 196 receives the streams of in-phase and quadrature symbols $I_X$ and $Q_X$ and generates a stream of data symbols d therefrom. The stream of data symbols d is applied to an appropriate data terminal device or other apparatus, etc.

Figure 6:
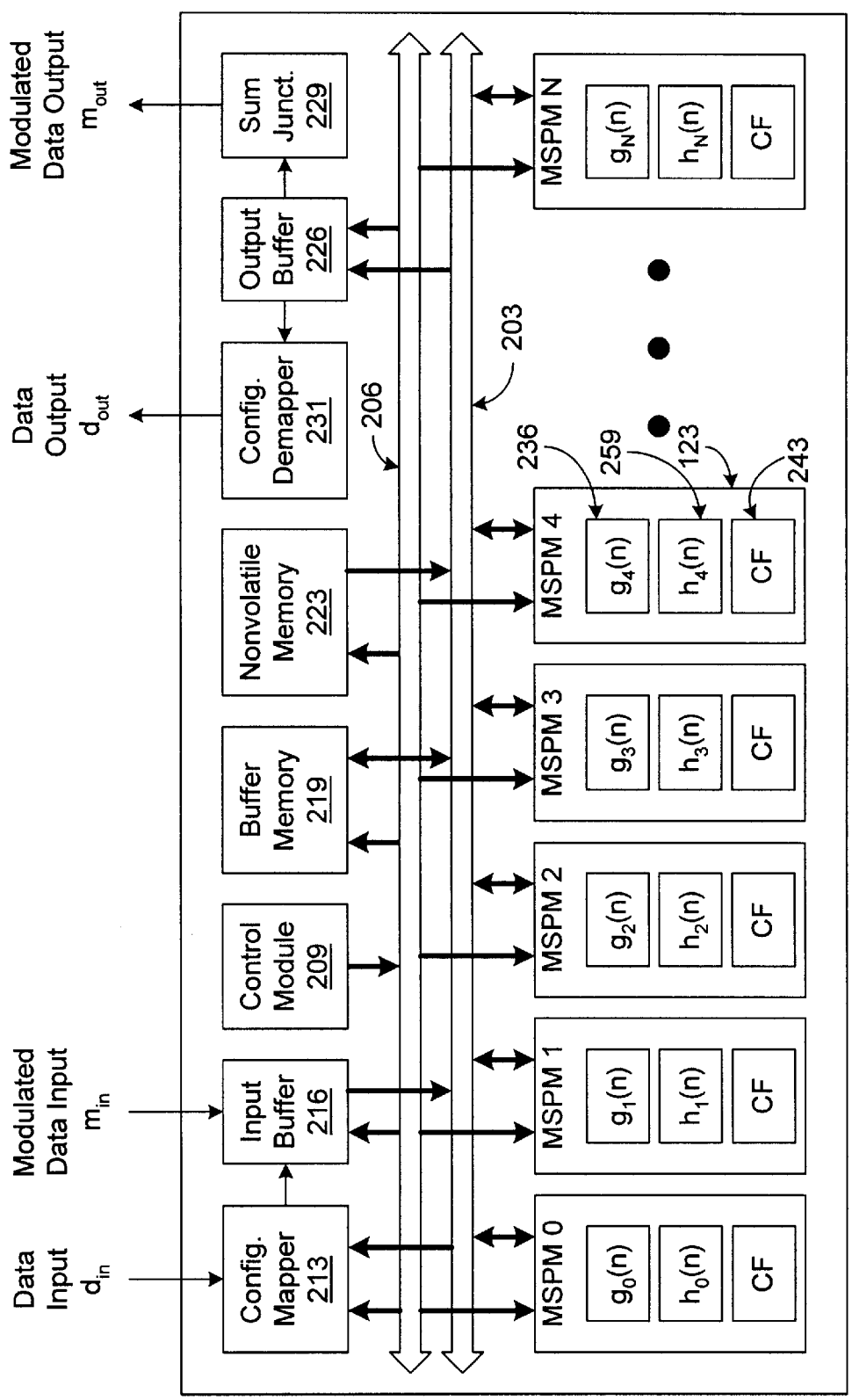
FIG. 6 is a block diagram of a modem circuit employed in the data communications system of FIG. 1.

Turning then, to FIG. 6, shown is a schematic of a configurable modem circuit 119 according to an embodiment of the present invention. The modem circuit 119 includes a data bus 203 and a control bus 206, both of which act as a local interface between the various components in the modem circuit 119. A control module 209 is coupled to the control bus 206 that controls the overall operation of the modem circuit 119. The control module 209 may be, for example, a state machine comprising a network of logical components or a processor circuit comprising a processor that executes control software stored on an accompanying memory.

The modem circuit 119 comprises several components that are coupled to the data bus 203 and the control bus 206 where appropriate. The control bus 206 comprises, for example, an addressing portion, a read conductor and a write conductor. Each of the circuit components has a predetermined address that allows the control module 209 to select any one of the components. Thereafter, the control module 109 may cause the selected component to read a value from or write a value to the data bus 203 via the read and write conductors, accordingly. The control module 109 is the only component that writes to the control bus 206, whereas all of the other components receive control information from the control bus 206.

The modem circuit 119 also includes a configurable mapper 213 that receives a stream of input data symbols $d_{in}$. The configurable mapper 213 maybe configured to operate as the CAP mapper 163 (FIG. 3A), the OFDM mapper 181

(FIG. 4A), or the DWM mapper 193 (FIG. 5A) based upon configuration values received by the configurable mapper 213 via the data bus 203. The output of the configurable mapper 213 is also coupled to an input buffer 216 that makes the in-phase I and quadrature Q data symbols available to the data bus 203. The input buffer 216 may also receive a stream of modulated data symbols via a modulated data input $m_{in}$, thereby making the modulated data symbols available to the data bus 203 as well. Note that the configurable mapper 213 may, for example, comprise three individual mappers to accomplish the necessary tasks, where one of the individual mappers is activated at any time to perform the mapping function for a particular modulation scheme.

The modem circuit 119 includes a buffer memory 219 and a nonvolatile memory 223, both of which are coupled to the address bus 203 and the control bus 206. The nonvolatile memory 223 maybe, for example, a permanent read only memory or other suitable memory device. In addition, an output buffer 226 is provided that is coupled to the data bus 203 and the control bus 206. The output buffer 226 is also coupled to a summing junction 229 that generates a stream of modulated output data symbols $m_{out}$. The output buffer 226 is also coupled to a configurable de-mapper 231 that generates a stream of output data symbols $d_{our}$ In addition, the modem circuit 119 features a number of multi-rate processor modules 123. The modules 123 can be configured to perform the functionality of the synthesis modules 123a (FIG. 2A) and the analysis modules 123b (FIG. 2B) based upon an input received from the data bus 203 and the control bus 206. Each module 123 includes two digital filters 236 and 239 that operate using respective filter coefficients $h_x(n)$ and $g_x(n)$. The filter coefficients $h_x(n)$ and $g_x(n)$ are written to each module 123 via the control bus 203 and the data bus 206. The digital filters 236 and 239 perform the functionality of the synthesizing digital filters 139 and 143 (FIG. 2A) or the analyzing digital filters 149 and 153 (FIG. 2B) depending upon how the particular module 123 is configured. There may be any number of modules 123 in the modem circuit 119. The modules 123 also include conversion factor registers 243 into which a sample rate conversion factor may be written from the data bus 203 and the control bus 206. The sample rate conversion factor written to the register 243 becomes the conversion factor by which the sample rate converters 133, 136, 156, and 159 (FIGS. 2A and 2B) operate.

Next, the operation of the modem circuit 119 is described. The modem circuit 119 can advantageously implement any one of a number of modulation schemes such as CAP, OFDM, or DWM as described previously, in addition to other schemes not discussed in detail herein. The particular modulation scheme executed by the modem circuit 119 is predefined and stored on the nonvolatile memory 223 along with any accompanying parameters or values. These parameters include, for example, the filter coefficients $h_x(n)$ and $g_x(n)$, sample rate conversion factors, and the mapping/de-mapping configuration employed for the executed modulation scheme.

Upon startup, the modem circuit 119 is initialized in one of several ways. If the modem circuit is to operate as a modulator, the control module 209 causes a mapping configuration value to be written to the configurable mapper 213 from the non-volatile memory 223 via the data and control busses 203 and 206 and configures the input buffer to receive symbols from the configurable mapper 213. The control module 209 also configures the output buffer 226 to send symbols received from the data bus 203 to the summing junction 229.

In the case where the modem circuit 119 is to operate as a demodulator, the control module 209 causes a de-mapping configuration value to be written to the configurable de-mapper 231 from the non-volatile memory 223 and configures the output buffer 226 to write symbols to the de-mapper 231. The mapper and the de-mapper 213 and 231 perform the particular type of mapping/de-mapping function based upon the configuration values received. The control module 209 also configures the input buffer 216 to receive the modulated data input $m_{in}$.

If the modem circuit 119 is to operate simultaneously as a modulator and a demodulator, then a configuration value is written to both the mapper 213 and the de-mapper 231 and the input and output buffers 216 and 226 are controlled to receive and/or write to data symbols from or to the appropriate location in a dynamic real time manner. Alternatively, two input buffers 216 and two output buffers 226 may be used to eliminate the need to configure these components. That is to say, the configurable mapper 213, the configurable de-mapper 231, the modulated data input $m_{in}$, and the summing junction 229 each may have their own buffer with which to interface with the data bus 203.

Also during initialization, the control module 209 causes each multi-rate signal processor module 123 is configured to operate as either a synthesis module 123a or an analysis module 123b by writing an appropriate configuration value to the modules 123 from the nonvolatile memory 223 via the data bus 203 and control bus 206. In addition, appropriate filter coefficients $h_x(n)$ and $g_x(n)$ and sample rate conversion factors are written to the desired digital filters 236 and 239 and conversion factor registers 243 for each of the multi-rate signal processor module 123 employed in the modulation and/or demodulation scheme(s) to be implemented.

After the modem circuit 119 is initialized, the control module 209 begins to shuttle data among the various components, depending upon the particular modulation scheme, demodulation scheme, or both that is performed by the modem circuit 119. Assuming the modem circuit 119 is to perform the function of the first, second, or third modulators 119aa, 119ab, 119ac, or other appropriate modulation scheme, then a stream of data input symbols $d_{in}$ are first received by the configurable mapper 213, and the resulting streams of in-phase and quadrature data symbols are stored in the input buffer 216. The control module 209 causes these symbols to be read from the input buffer 216 and written to an appropriate module 123 for processing. Where symbols are generated by a particular module 123 and are to be supplied to another module 123, then the control module 209 shuttles these symbols between the modules 123, using the buffer memory 219 for temporary storage of such data symbols as needed. In a sense, the shuttling function of the control module 209 acts to link the various modules 123 to each other according to the particular modulation scheme performed. When specific constant values are to be read to a particular input of one of the modules 123, the control module 209 writes such value to the appropriate module 123 from the nonvolatile memory 223. The control module 209 also writes data symbols to the output buffer 226 from the appropriate modules 123 which are then applied to the summing junction 229 which performs the functionality of the summing junction 166 (FIGS. 3A, 4A, and 5A). Thereafter, the modulated output data symbols $m_{out}$ are written to a digital-to-analog converter and applied to the communications channel 113 (FIG. 1).

Assuming the modem circuit 119 is to perform the function of the first, second, or third demodulators 119ba, 119bb, 119bc, or other appropriate demodulation scheme, then a stream of modulated data symbols $m_{in}$ are first received by the input buffer 216 where they wait to be accessed by the control module 209. The control module 209 applies the modulated data symbols $m_{in}$ to the appropriate multi-rate signal processing modules 123 that have been configured to perform the functionality of the analyzing modules 123b. During data communications, the control module 209 continues to shuttle the data symbols among the modules 123 according to the particular demodulation scheme performed. When the in-phase and quadrature symbols are generated by the modules 123, the control module 209 will write the symbols to the output buffer 226 that then supplies the same to the configurable de-mapper 231. The configurable de-mapper 231 generates the data output symbols $d_{out}$ therefrom.

In light of the foregoing, it should be apparent that the control module 209 performs the function of shuttling data symbols between the various components during data communication, acting as the link between modules 123 according to the modulation or demodulation scheme as discussed with reference to FIGS. 3A, 3B, 4A, 4B, 5A, and 5B.

The description above with regard to FIG. 6 illustrates one embodiment of the modem circuit 119 using a design that employs a processor circuit with dedicated logic circuits. In other embodiments, the functionality of the configurable modem circuit 119 may be accomplished entirely in software using a processor circuit having a processor and volatile/nonvolatile memory coupled via a local interface. In another embodiment, the functionality of the present invention may be accomplished using a complex dedicated logical circuit using various logical components.

Many variations and modifications may be made to the above-described embodiment(s) of the invention without departing substantially from the spirit and principles of the invention. All such modifications and variations are intended to be included herein within the scope of the present invention.

Therefore, having thus described the invention, at least the following is claimed:

1. A configurable modem circuit for modulating/demodulating a data signal, comprising:
    a plurality of configurable multi-rate signal processing modules coupled to a local interface, each of the configurable multi-rate processing modules comprising:
        a first sample rate converte;:
        a first digital filter coupled to the first sample rate converter;
        a second sample rate converter; and
        a second digital filter coupled to the second sample rate converter and also coupled to the first digital filter;
    a first one of the multi-rate signal processing modules being configured to process a data signal in accordance with a first modulation/demodulation scheme, a second one of the multi-rate signal processing modules being configured to process a data signal in accordance with a second modulation/demodulation scheme, the first modulation/demodulation scheme being different than the second modulation/demodulation scheme; and
    a control module coupled to the local interface, the control module being adapted to shuttle a number of data symbols among the configurable multi-rate processing modules according to a predefined modulation/demodulation scheme such that, in response to receiving a data signal corresponding to the first modulation/demodulation scheme, the controller shuttles data symbols to the first one of the multi-rate signal processing modules for processing and, in response to receiving a data signal corresponding to the second modulation/demodulation scheme, the controller shuttles data symbols to the second one of the multi-rate signal processing modules for processing.

2. The circuit of claim 1, wherein the configurable multi-rate signal processing modules are synthesis modules configured to generate a modulated data signal from a number of data symbols.

3. The circuit of claim 1, wherein the configurable multi-rate signal processing modules are analysis modules configured to recover a number of data symbols from a modulated data signal.

4. The circuit of claim 1, further comprising at least one mapper coupled to the local interface.

5. The circuit of claim 1, further comprising a configurable mapper coupled to the local interface, the configurable mapper being configured to receive a stream of input data symbols and, in response to receiving a first configuration signal corresponding to the first modulation/demodulation scheme, mapping the stream of input data symbols into a stream of in-phase data symbols and a stream of quadrature data symbols corresponding to the first modulation/demodulation scheme and, in response to receiving a second configuration signal corresponding to the second modulation/demodulation scheme, mapping the stream of input data symbols into a stream of in-phase data symbols and a stream of quadrature data symbols corresponding to the second modulation/demodulation scheme.

6. The circuit of claim 1, further comprising at least one de-mapper coupled to the local interface.

7. The circuit of claim 1, further comprising a configurable de-mapper coupled to the local interface, the configurable de-mapper being configured to receive a stream of in-phase data symbols and a stream of quadrature data symbols and, in response to receiving a first de-configuration signal corresponding to the first modulation/demodulation scheme, de-mapping the stream of in-phase data symbols and the stream of quadrature data symbols into a stream of input data symbols corresponding to the first modulation/demodulation scheme and, in response to receiving a second deconfiguration signal corresponding to the second modulation/demodulation scheme, de-mapping the stream of in-phase data symbols and the stream of quadrature data symbols into a stream of input data symbols corresponding to the second modulation/demodulation scheme.

8. The circuit of claim 1, further comprising a summing junction coupled to the local interface.

9. A configurable modem circuit for modulating/demodulating a data signal, comprising:
    a number of configurable multi-rate signal processing modules, each of the configurable multi-rate processing modules comprising:
        a first sample rate converter;
        a first digital filter coupled to the first sample rate converter;
        a second sample rate converter; and
        a second digital filter coupled to the second sample rate converter and also coupled to the first digital filter;
    a first one of the multi-rate signal processing modules being configured to process a data signal in accordance with a first modulation/demodulation scheme, a second one of the multi-rate signal processing modules being configured to process a data signal in accordance with a second modulation/demodulation scheme, the first modulation/demodulation scheme being different than the second modulation/demodulation scheme; and means for shuttling a number of data symbols among the configurable multi-rate signal processing modules according to either of the first or second modulation/demodulation schemes.

10. The system of claim 9, further comprising a means for mapping a stream of data symbols into at least one stream of quadrature data symbols and at least one stream of in-phase data symbols.

11. The system of claim 9, further comprising a means for performing an addition of a quadrature component and an in-phase component of a data signal.

12. A system for modulating a data signal for transmission over a communications channel, comprising:

a configurable input mapper coupled to a local interface, the input mapper having a data input;

a control module coupled to the local interface;

a buffer memory coupled to the local interface;

a number of synthesis modules coupled to the local interface, a first one of the synthesis modules being configured to process a data signal in accordance with a first modulation scheme, a second one of the synthesis modules being configured to process a data signal in accordance with a second modulation scheme, the first modulation scheme being different than the second modulation scheme; and an output summing node coupled to the local interface, the output summing node having a modulated data outputs, the control module being adapted to shuttle a number of data symbols among the synthesis modules such that, in response to receiving a data signal corresponding to the first modulation scheme, the controller shuttles data symbols to the first one of the synthesis modules for processing and, in response to receiving a data signal corresponding to the second modulation scheme, the controller shuttles data symbols to the second one of the synthesis modules for processing.

13. The system of claim 12, wherein each of the synthesis modules further comprise:

a first sample rate converter;

a first digital filter coupled to the first sample rate converter;

a second sample rate converter;

a second digital filter coupled to the second sample rate converter; and a summing junction coupled to the first and second digital filters.

14. The system of claim 12, wherein the control module further comprises a state machine.

15. The system of claim 12, wherein the control module further comprises:

a processor;

a local memory; and a data distribution logic stored on the memory, wherein the data distribution logic is executed by the processor.

16. The system of claim 12, wherein the configurable mapper further comprises a carrierless amplitude/phase mapping circuit.

17. The system of claim 12, wherein the configurable mapper further comprises a multi-channel mapping circuit.

18. The system of claim 12, wherein the configurable mapper further comprises a discrete wavelet mapping circuit.

19. A system for modulating a data signal for transmission over a communications channel, comprising:

means for mapping a number of data symbols in a data signal;

means for shuttling a number of mapped data signals among a number of synthesis modules;

means for processing the mapped data signals in the synthesis modules such that a first one of the synthesis modules is configured to process a data signal in accordance with a first modulation scheme and a second one of the synthesis modules is configured to process a data signal in accordance with a second modulation scheme, the first modulation scheme being different than the second modulation scheme; and means for summing a number of quadrature symbols and a number of in-phase symbols generated by the synthesis modules to generate a modulated data output signal, the means for shuttling being configured such that, in response to receiving a data signal corresponding to the first modulation scheme, the means for shuttling shuttles data symbols to the first one of the synthesis modules for processing and, in response to receiving a data signal corresponding to the second modulation scheme, the means for shuttling shuttles data symbols to the second one of the synthesis modules for processing.

20. A method for modulating a data signal for transmission over a communications channel, comprising the steps of:

mapping a number of data symbols in a data signal;

shuttling a number of mapped data signals among a number of synthesis modules such that, in response to receiving a data signal corresponding to the first modulation scheme, data symbols are shuttled to the first one of the synthesis modules for processing and, in response to receiving a data signal corresponding to the second modulation scheme, data symbols are shuttled to the second one of the synthesis modules for processing;

processing the mapped data signals in the synthesis modules such that, a first one of the synthesis modules processes a data signal in accordance with a first modulation scheme, and a second one of the synthesis modules processes a data signal in accordance with a second modulation scheme, the first modulation scheme being different than the second modulation scheme such that, in response to receiving a data signal corresponding to the first modulation scheme, the first one of the synthesis modules processes the mapped data signals and, in response to receiving a data signal corresponding to the second modulation scheme, the second one of the synthesis modules processes the mapped data signals; and summing a number of quadrature symbols and a number of in-phase symbols generated by the synthesis modules to generate a modulated data output signal.

21. The method of claim 20, wherein the step of processing the mapped data signals in the synthesis modules further comprises the steps of:

up-converting a first sample rate of a first mapped data signal;

digitally filtering the first mapped data signal;

up-converting a second sample rate of a second mapped data signal;

digitally filtering the second mapped data signal; and summing the first and second mapped data signals.

22. A system for demodulating a data signal transmitted over a communications channel, comprising:

an input buffer coupled to a local interface;

a control module coupled the local interface;

a buffer memory coupled to the local interface;

a number of analysis modules coupled to the local interface, a first one of the analysis modules being configured to process quadrature and in-phase symbols in accordance with a first demodulation scheme, a second one of the analysis modules being configured to process quadrature and in-phase symbols in accordance with a second demodulation scheme, the first demodulation scheme being different than the second demodulation scheme; and a configurable de-mapper coupled to the local interface, the control module being adapted to shuttle a number of quadrature and in-phase symbols among the analysis modules such that, in response to receiving a data signal corresponding to the first demodulation scheme, the controller shuttles quadrature and in-phase symbols to the first one of the analysis modules for processing and, in response to receiving a data signal corresponding to the second demodulation scheme, the controller shuttles quadrature and in-phase symbols to the second one of the analysis modules for processing.

23. The system of claim 22, wherein each of the analysis modules further comprise:

a first digital filter and a second digital filter coupled to a common input node;

a first sample rate down-converter coupled to the first digital filter; and a second sample rate down-converter coupled to the second digital filter.

24. The system of claim 22, wherein the control module further comprises a state machine.

25. The system of claim 22, wherein the control module further comprises:

a processor;

a local memory; and a data distribution logic stored on the memory, wherein the data distribution logic is executed by the processor.

26. The system of claim 22, wherein the configurable de-mapper further comprises:

a carrierless amplitude/phase de-mapping circuit;

a multi-channel de-mapping circuit; and a discrete wavelet de-mapping circuit.

27. A system for demodulating a data signal transmitted over a communications channel, comprising:

means for generating a number of quadrature symbols and a number of in-phase symbols from a modulated data signal;

means for shuttling the quadrature and in-phase symbols among a number of analysis modules;

means for processing the quadrature and in-phase symbols in the analysis modules such that a first one of the analysis modules is configured to process quadrature and in-phase symbols in accordance with a first demodulation scheme and a second one of the analysis modules is configured to process quadrature and in-phase symbols in accordance with a second demodulation scheme, the first demodulation scheme being different than the second demodulation scheme; and means for de-mapping the quadrature and in-phase symbols, thereby recovering an original data signal, the means for shuttling being adapted to shuttle a number of quadrature and in-phase symbols among the analysis modules such that, in response to receiving a data signal corresponding to the first demodulation scheme, the means for shuttling shuttles quadrature and in-phase symbols to the first one of the analysis modules for processing and, in response to receiving a data signal corresponding to the second demodulation scheme, the means for shuttling shuttles quadrature and in-phase symbols to the second one of the analysis modules for processing.

28. A method for demodulating a data signal transmitted over a communications channel, comprising the steps of:

generating a number of quadrature symbols and a number of in-phase symbols from a modulated data signal;

shuttling the quadrature and in-phase symbols among a number of analysis modules such that, a first one of the analysis modules processes quadrature and in-phase symbols in accordance with a first demodulation scheme, and a second one of the analysis modules processes quadrature and in-phase symbols in accordance with a second demodulation scheme, the first demodulation scheme being different than the second demodulation scheme;

processing the quadrature and in-phase symbols in the analysis modules; and de-mapping the quadrature and in-phase symbols, thereby recovering an original data signal.

29. The method of claim 28, wherein the step of processing the quadrature and in-phase symbols in the analysis modules further comprises the steps of:

filtering a symbol input with a first digital filter and a second digital filter, the first and second digital filters being in parallel;

down-converting a first sample rate of the output of the first digital filter; and down-converting a second sample rate of the output of the second digital filter.

* * * * *